US012748123B2

(12) United States Patent
Flagstad et al.

(10) Patent No.: US 12,748,123 B2
(45) Date of Patent: Sep. 29, 2026

(54) DEVICE FOR DETECTING IMPACT ON FLOORING

(71) Applicant: Schmidt Custom Floors, Inc., Waukesha, WI (US)

(72) Inventors: Tim Flagstad, Waukesha, WI (US); Ronald J. Pulvermacher, Cottage Grove, WI (US)

(73) Assignee: Schmidt Custom Floors, Inc., Waukesha, WI (US)

( * ) Notice: Subject to any disclaimer, the term of this patent is extended or adjusted under 35 U.S.C. 154(b) by 0 days.

(21) Appl. No.: 18/389,716

(22) Filed: Dec. 19, 2023

(65) Prior Publication Data

US 2024/0201220 A1 Jun. 20, 2024

Related U.S. Application Data

(60) Provisional application No. 63/433,843, filed on Dec. 20, 2022.

(51) Int. Cl.
*G01P 1/02* (2006.01)
*G01P 1/07* (2006.01)

(52) U.S. Cl.
CPC ................ *G01P 1/023* (2013.01); *G01P 1/02* (2013.01); *G01P 1/07* (2013.01)

(58) Field of Classification Search
CPC ............... G01P 1/023; G01P 1/02; G01P 1/07
See application file for complete search history.

(56) References Cited

U.S. PATENT DOCUMENTS

| | | | | |
|---|---|---|---|---|
| 7,394,363 | B1 * | 7/2008 | Ghahramani | G08B 13/19608 340/541 |
| 2005/0017873 | A1 * | 1/2005 | Liu | G01M 5/0041 340/870.01 |
| 2006/0042381 | A1 * | 3/2006 | Still | G01P 1/023 73/493 |
| 2013/0154441 | A1 * | 6/2013 | Redmond | H02N 2/181 235/492 |
| 2015/0005951 | A1 * | 1/2015 | Srinivasan | G05B 15/02 700/275 |
| 2016/0363606 | A1 * | 12/2016 | Hyland | G01P 1/023 |
| 2017/0328930 | A1 * | 11/2017 | Unsal | G01P 13/00 |

(Continued)

FOREIGN PATENT DOCUMENTS

| | | | | |
|---|---|---|---|---|
| EP | 3851851 | A1 * | 7/2021 | |
| ES | 2363233 | T3 * | 7/2011 | F24D 3/12 |

OTHER PUBLICATIONS

Translation of ES2363233.*

*Primary Examiner* — Helen C Kwok
(74) *Attorney, Agent, or Firm* — Jansson Munger & McKinley Ltd.

(57) ABSTRACT

Apparatus for detecting mechanical impact on flooring material including (1) a case configured to be embedded and securely attached in an underside cavity of a piece of the flooring material and (2) a circuit board securely mounted in the case, the circuit board including (i) an accelerometer mounted on the circuit board, configured to measure acceleration of the piece of flooring material and (ii) a radio transmitter configured to receive acceleration data from the accelerometer and transmit the data therefrom, thereby detecting movement of the flooring material and providing remote indication of the movement.

4 Claims, 8 Drawing Sheets

(56) References Cited

U.S. PATENT DOCUMENTS

| | | | | |
|---|---|---|---|---|
| 2017/0363587 | A1* | 12/2017 | Takamine | G01N 29/043 |
| 2018/0011076 | A1* | 1/2018 | Radjy | G01N 33/383 |
| 2018/0045621 | A1* | 2/2018 | Radjy | G01N 33/383 |
| 2018/0052146 | A1* | 2/2018 | Radjy | G01N 33/383 |
| 2018/0342929 | A1* | 11/2018 | Webster | G01V 3/38 |
| 2018/0375444 | A1* | 12/2018 | Gamroth | G05B 19/0426 |
| 2019/0101522 | A1* | 4/2019 | Radjy | E04B 5/32 |
| 2019/0391287 | A1* | 12/2019 | Meier | G06Q 40/08 |
| 2020/0341457 | A1* | 10/2020 | Prugh | G05B 19/4155 |
| 2021/0063336 | A1* | 3/2021 | Ghods | B28C 7/024 |
| 2022/0034724 | A1* | 2/2022 | Cathcart | G06Q 50/08 |
| 2022/0074963 | A1* | 3/2022 | Mancini | G01P 1/023 |
| 2022/0291070 | A1* | 9/2022 | Burke | G08B 17/117 |
| 2022/0342989 | A1* | 10/2022 | Bunker | G06V 20/52 |
| 2022/0384857 | A1* | 12/2022 | Miyazaki | H01M 10/48 |

* cited by examiner

FIG. 7
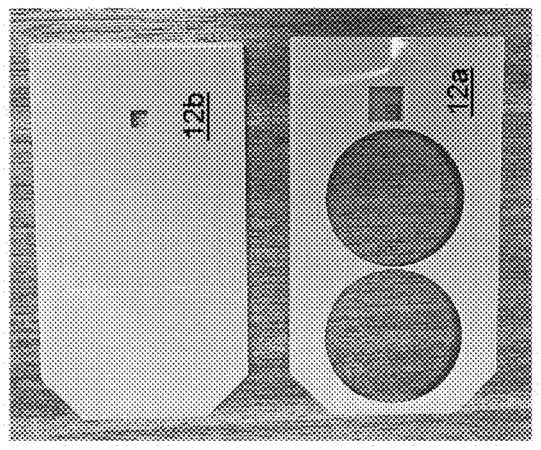
FIG. 8

DEVICE FOR DETECTING IMPACT ON FLOORING

RELATED APPLICATION

This application claims the benefit of U.S. Provisional Application 63/433,843, filed on Dec. 20, 2022, the entire contents of which is incorporated herein by reference.

FIELD OF THE INVENTION

The present invention generally relates to the field of so-called smart-home devices and systems, and more particularly to the field of apparatus for detecting the presence of human activity in a building spaces.

BACKGROUND OF THE INVENTION

So-called "smart home" devices provide useful and often important data about living spaces and other types of facilities such as retail and office spaces. Such devices may be able to transmit such data to remote locations in a variety of ways, including through means such as Bluetooth and/or Wi-Fi connections and the Internet.

One such useful type of information to provide is a simple indication of the presence of activity in a space without indicating what type of activity is occurring. For example, the owner of a vacation home may wish to be informed when someone has entered the home when there should not be anyone using the home, such as an intruder or another unauthorized activity such as a teenage party, or indeed to indicate the arrival of invited guests. The same situations may occur, of course, is a homeowner is away from home. There is a need for improved apparatus addressing such needs and satisfying such purposes.

SUMMARY OF THE INVENTION

Broadly described, the apparatus of the present invention is for the purpose of detecting such activity by placing an accelerometer inside a piece of flooring, such as wood flooring, in a manner that the mechanical impact of activity on the floor over a substantial region of the floor can be detected by vibrations which travel in the flooring material for distances sufficient for an the entire region of concern.

In some embodiments of the invention, the apparatus may involve an embedded accelerometer combined with other sensors also advantageously embedded in a piece of flooring. One such application is apparatus including humidity and temperature sensors for embedding in flooring (such as hardwood flooring) for purposes including the monitoring of conditions to which the flooring is exposed and to control the temperature and humidity in order to maintain the flooring at conditions such that the flooring will retain its installed quality.

More specifically, the present invention is apparatus for detecting mechanical impact on flooring material. The inventive apparatus includes (1) a case configured to be embedded and securely attached in an underside cavity of a piece of the flooring material being used and (2) a circuit board securely mounted in the case. The circuit board has (i) an accelerometer mounted on the circuit board configured to measure acceleration of the piece of flooring material and (ii) a radio transmitter configured to receive acceleration data from the accelerometer and transmit the data from there. The apparatus detects movement of the flooring material and provides a remote indication of the movement.

In highly-preferred embodiments, the accelerometer is configured to detect vertical acceleration.

In some highly-preferred embodiments, the apparatus for detecting mechanical impact further includes at least one humidity sensor, and some of these embodiments also include at least one temperature sensor. In some embodiments, the at least one humidity sensor is two humidity sensors and the at least one temperature sensors is two temperature sensors, and in some embodiments the two humidity sensors and two temperature sensors include two combined humidity/temperature sensors, one mounted on the top of the circuit board and the other mounted on the bottom of the circuit board.

Some highly-preferred embodiments of the invention include a computer processor which is programmable.

The structure and performance of the present invention will be apparent from the following descriptions and from the drawings.

BRIEF DESCRIPTION OF THE DRAWINGS

FIG. 7 is a photographic image showing the top and bottom portions of the case of the device of FIG. 1.

FIG. 8 is a photographic image of a representative piece of flooring material, viewed from the underside and showing the cavity therein without the inventive apparatus installed.

DETAILED DESCRIPTION OF PREFERRED EMBODIMENTS

Figure 1:
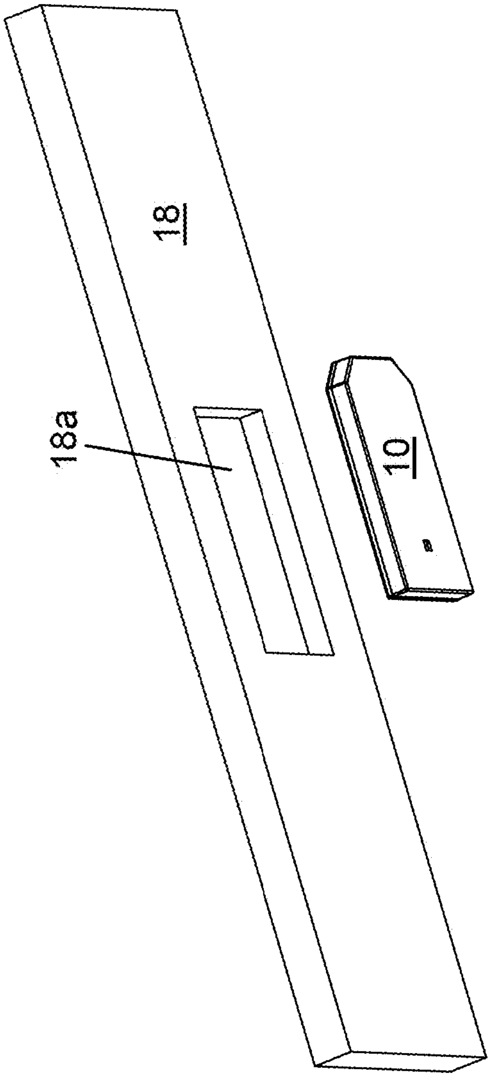
FIG. 1 is an exploded perspective view of a representative piece of flooring having a cavity on its underside and an embodiment of the inventive apparatus to be installed therein.

FIGS. 1 through 6 illustrate details of an embodiment of the inventive apparatus 10. Apparatus 10 includes an accelerometer 22 and two combined humidity/temperature sensors 24*a* and 24*b* all mounted with other circuit components 38 on a circuit board 20 and installed in a case 12.

FIG. 1 illustrates apparatus 10 next to a piece 18 of flooring material into which an underside flooring cavity 18*a* has been formed in an underside 18*u* of piece 18. For example, if piece 18 is a piece of hardwood, cavity 18*a* may be formed by routing out cavity 18*a*. In situ, apparatus 10 is installed into cavity 18*a*, and piece 18 of flooring material is installed as part of a floor (not shown) in a building (not shown).

Figure 2:
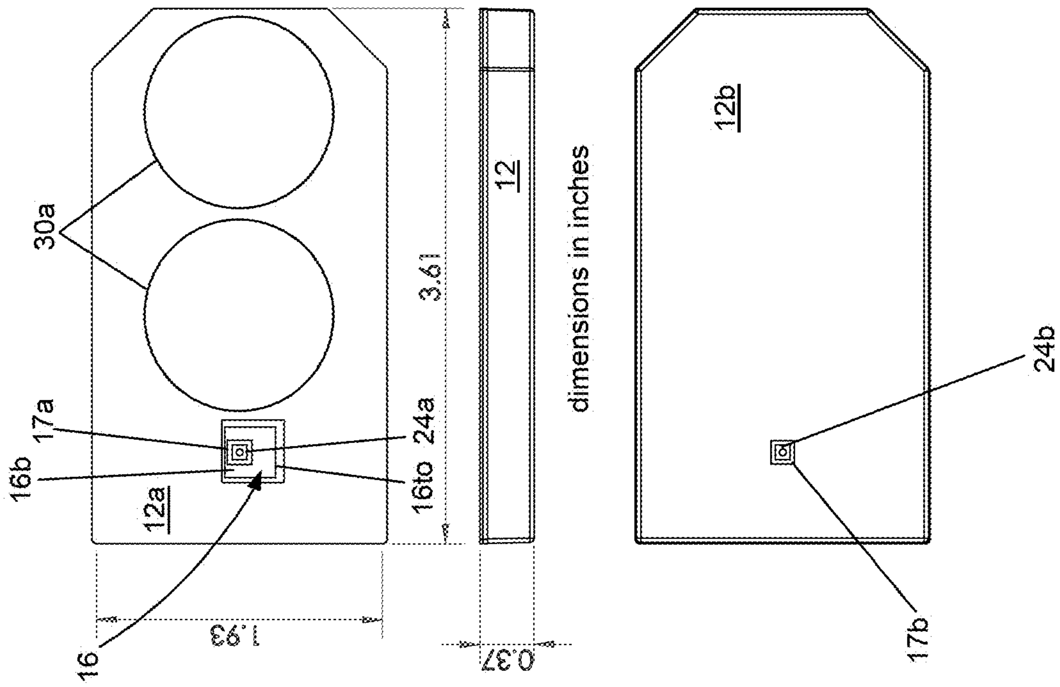
FIG. 2 is a three-view drawing of the apparatus of FIG. 1, showing a top view, an edge view and a bottom view.
Figure 3:
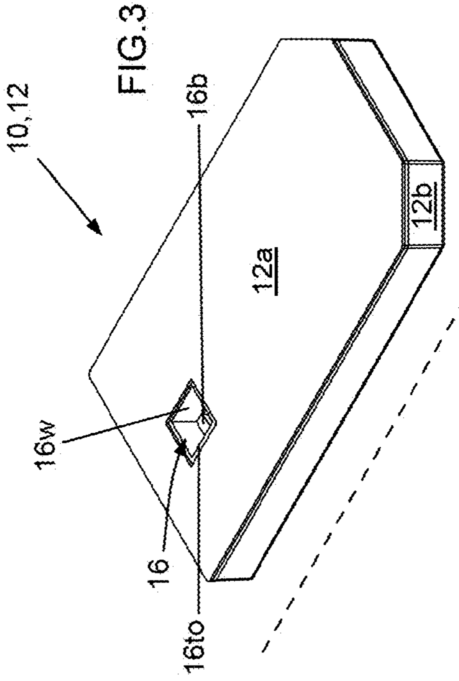
FIG. 3 is a perspective view of the apparatus of FIG. 1.

FIG. 2 is a three-view drawing of apparatus 10, showing case top 12*a* in the upper region of FIG. 2, case bottom 12*b* in the lower region of FIG. 12, and an edge view of case 12 between the upper and lower portions of FIG. 12. Referring also to FIG. 3, case 12 of apparatus 10 includes a case top 12*a* and a case bottom 12*b* configured to be assembled together to form case 12. Case 12 may be made of a suitable polymeric material by a variety of net shape manufacturing processes such as but not limited to molding or 3D-printing. Case-top 12*a* includes a sensed volume 16 formed by a sensed-volume top opening 16 to, four sensed-volume walls 16*w*, and a sensed-volume bottom 16*b*, sensed-volume top opening 16 to being covered by a portion of piece 18 of flooring material within cavity 18*a*. Sensed-volume bottom 16*b* includes a case-bottom sensor opening 17*a* which is positioned over sensor 24*a* on circuit board 20, exposing sensor 24*a* to the humidity and temperature conditions within sensed volume 16.

Case top 12 also includes two battery openings 30*a* therein. Note that the illustration of case top 12*a* and the later photographic images of case 12*a* in FIGS. 7-10 slightly differ. Such differences are entirely inconsequential.

The lower view in FIG. 2 shows case bottom 12*b* which has case-bottom sensor opening 17*b* which is positioned over sensor 24*b*, exposing sensor 24*b* to the humidity and temperature conditions below apparatus 10 and above whatever under-structure (not shown) on which the flooring material is laid.

Figure 4:
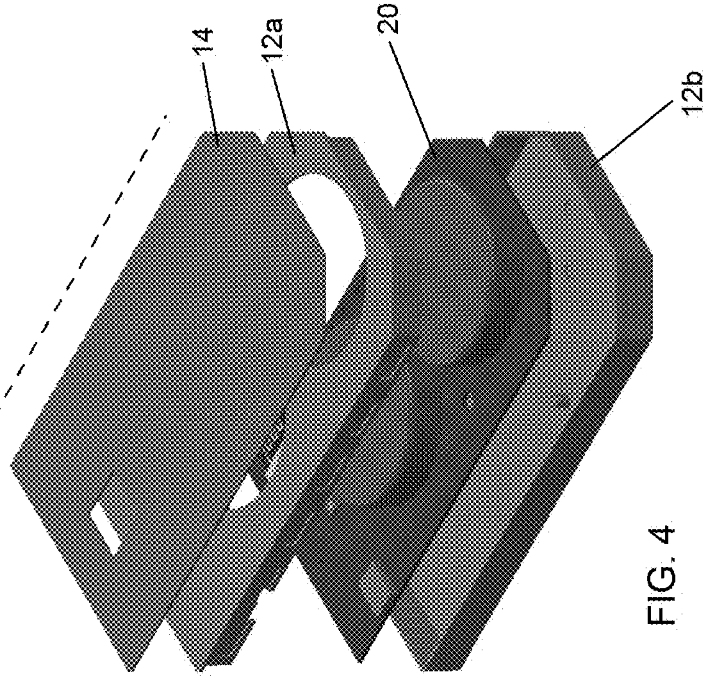
FIG. 4 is an exploded perspective view of the apparatus of FIG. 1, including an adhesive layer for attachment of the apparatus.

FIG. 4 is an exploded perspective drawing of embodiment 10, illustrating the inclusion of an adhesive layer 14 for attaching apparatus 10 within cavity 18*a*. FIG. 4 also illustrates two batteries 30 installed on circuit board 20.

Figure 5B:
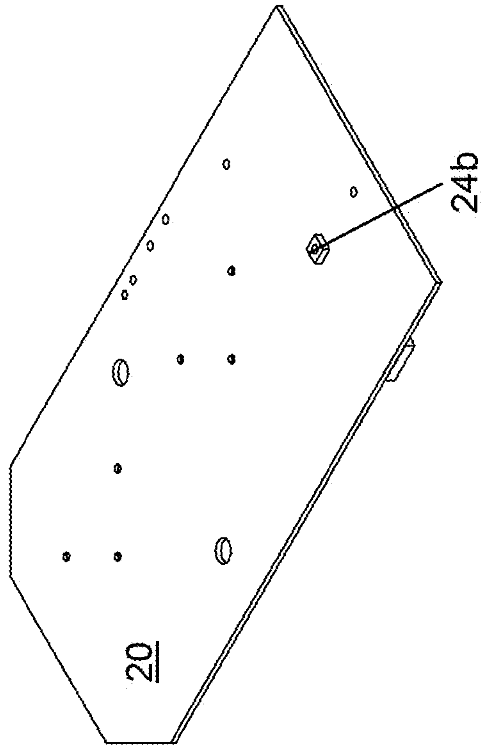
FIGS. 5A and 5B are top and bottom perspective views, respectively, of the circuit board of the apparatus of FIG. 1, such embodiment including two humidity sensors and two temperature sensors as well as an accelerometer and many other circuit components.
Figure 5A:
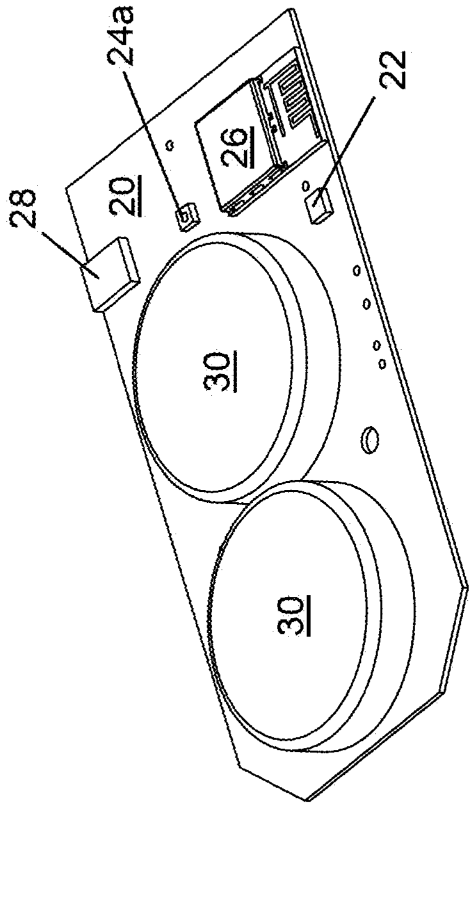

FIGS. 5A and 5B are top and bottom surface drawings, respectively, of an embodiment of circuit board 20 on which all but bottom humidity/temperature sensor 24*b* are mounted on the top surface (FIG. 5A) of circuit board 20. Circuit board 20 includes a Wi-Fi radio module 26 and a Bluetooth® module 28, both of which include programmable microprocessor functionality used to control the functions of apparatus 10.

Figure 6A:
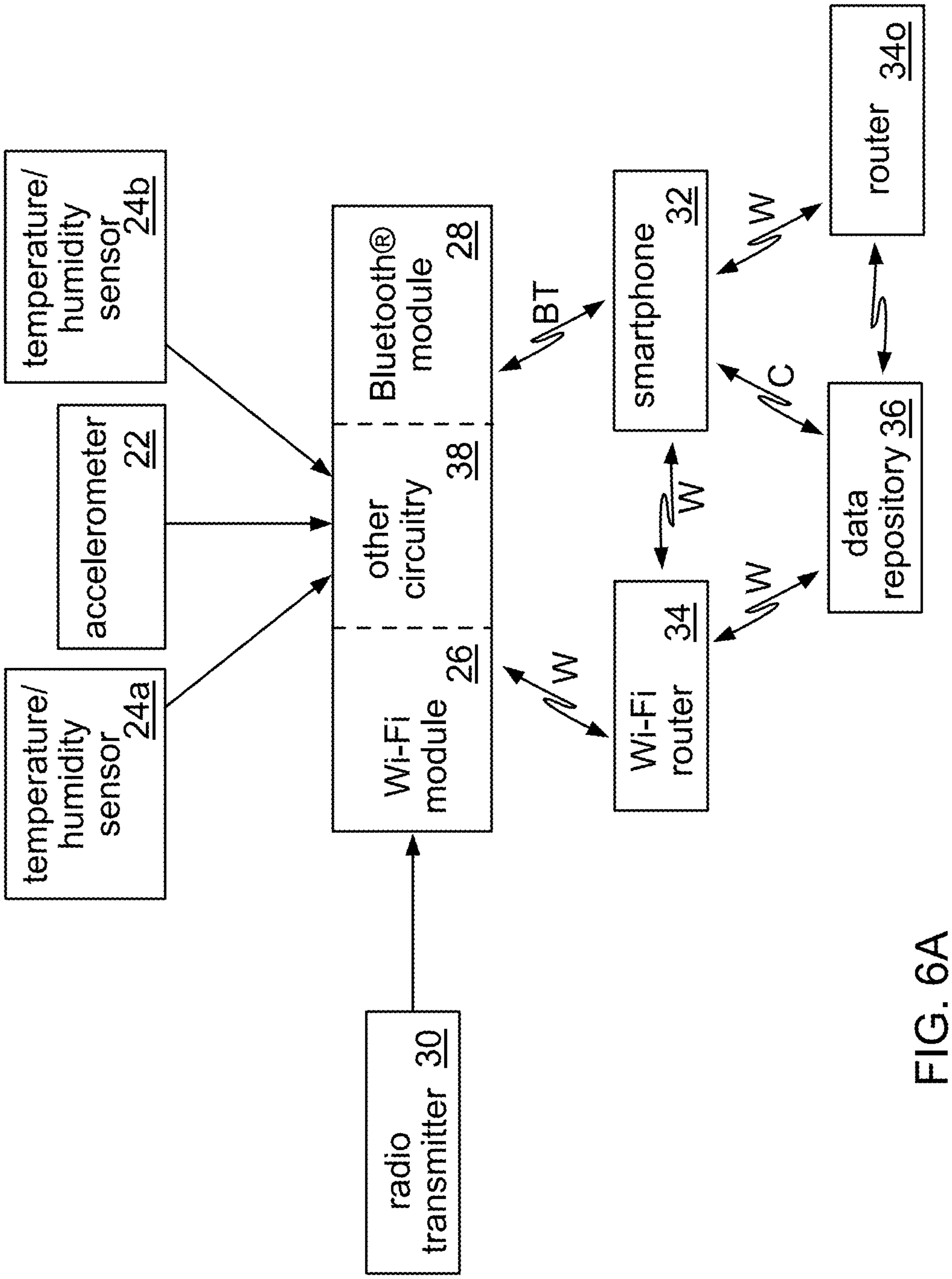
FIG. 6A is a schematic block diagram of the circuitry on the circuit board of FIGS. 5A and 5B as well as the communication system interacting with the apparatus of FIG. 1.

FIG. 6A is a high-level schematic block diagram of the circuitry of circuit 20 and the external elements of the system configured to communicate with apparatus 10. FIG. 6 shows external elements as a smartphone 32, a Wi-Fi router 34 providing connection to the Internet, and an Internet cloud-based data repository 36. The six double-ended arrows in FIG. 6A indicate radio-transmission connections with Wi-Fi radio module 26 and a Bluetooth® module 28 and among the four external elements 32, 34, 340, and 36. Each such double-ended arrow is labeled with a W, BT, or C to indicate the nature of the radio transmission therethrough, as Wi-Fi, Bluetooth®, and cellular, respectively. Thus, acceleration, humidity, and temperature data are available to data repository 36 and smartphone 32 via several pathways as indicated.

Figure 6B:
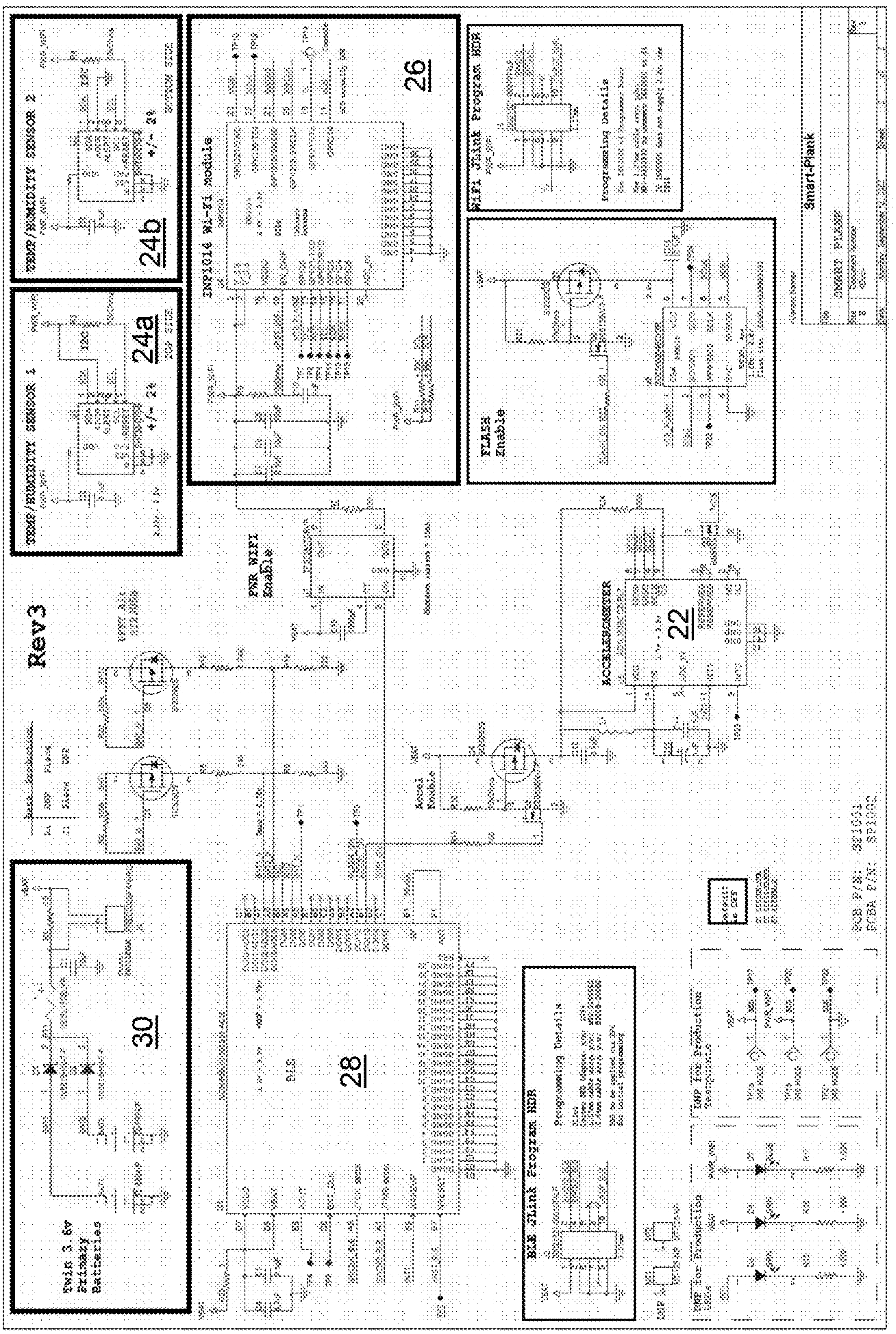
FIG. 6B is a detailed schematic of the electronic circuitry of the circuit board of FIGS. 5A and 5B.

FIG. 6B is a detailed schematic of the electronic circuitry of circuit board 20 and requires no further explanation.

FIGS. 7 through 10 are photographic images showing various views of a prototype of an embodiment of inventive apparatus 10. FIG. 7 show embodiments of case top 12*a* and case bottom 12*b*, formed in plastic material, and FIG. 8 shows a representative piece of wood flooring material 18, viewed from its underside in order to show underside flooring cavity 18*a* formed therein and sized to accommodate installation of apparatus 10 therein.

Figure 9:
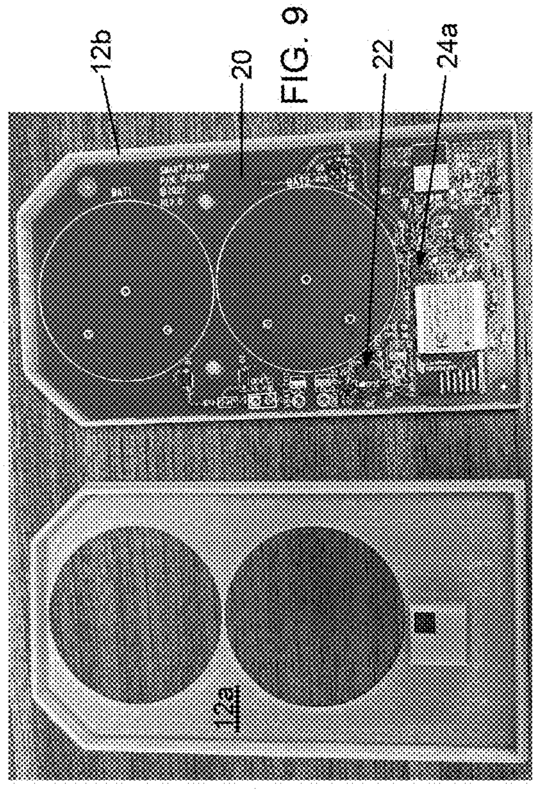
FIG. 9 is a photographic image of the inside of the case of the apparatus of FIG. 1 with the circuit board shown in the bottom of the case.
Figure 10:
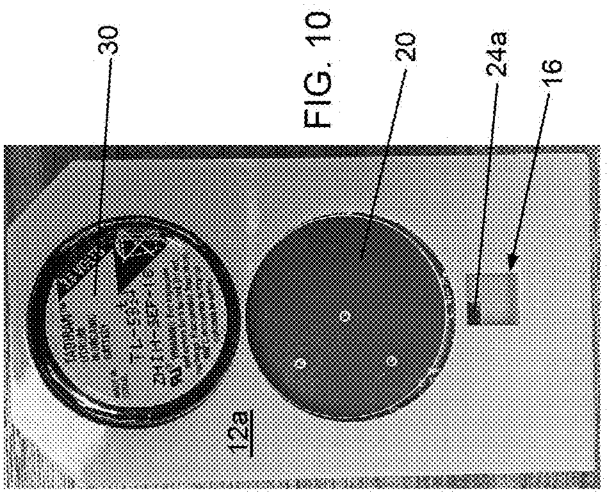
FIG. 10 is a photographic image of the top side of the apparatus of FIG. 1, showing only one battery on the circuit board.

FIG. 9 shows the inside of case 12 with case top 12*a* on the left and case bottom 12*b* with circuit board 20 positioned therein. FIG. 10 shows case 12 in an assembled state but with one battery 30 not present.

Accelerometer 22 may be an accelerometer semiconductor chip such as model ADXL363BCCZ-RL7 manufactured by Analog Devices, headquartered in Wilmington, Massachusetts. Combined humidity/temperature sensors 24*a* and 24*b* may be semiconductor chips such as model SHT30-DIS-8 manufactured by Sensirion AG headquartered in Stäfa, Switzerland.

While the principles of this invention have been described in connection with specific embodiments, it should be understood clearly that these descriptions are made only by way of example and are not intended to limit the scope of the invention.

The invention claimed is:

1. Apparatus for detecting mechanical impact on a flooring material indicating the presence of human activity, the apparatus comprising:
- a case configured to be installed into and secured within a preformed underside cavity in a piece of the flooring material, the case further configured to define (a) a sensed volume exposed to an underside of the flooring material within the preformed cavity and (b) a case-bottom opening exposed to an understructure beneath the flooring material; and
- a circuit board having a top and a bottom and being secured in the case, the circuit board including:
  - an accelerometer mounted on the circuit board, configured to measure acceleration of the flooring material, indicating the presence of human activity thereon;
  - a first humidity sensor and a first temperature sensor each mounted on the top of the circuit board thereby positioning the first humidity sensor and the first temperature sensor to sense humidity and temperature conditions within the sensed volume;
  - a second humidity sensor and a second temperature sensor each mounted on the bottom of the circuit board thereby positioning the second humidity sensor and the second temperature sensor to sense the understructure temperature and humidity conditions beneath the flooring material; and
  - a radio transmitter configured to transmit acceleration, humidity and temperature data therefrom, thereby providing a remote indication of human activity on the flooring material and separate measurements of both humidity and temperature in the flooring material and below the flooring material.

2. The apparatus for detecting mechanical impact of claim 1 wherein the accelerometer is configured to detect vertical acceleration.

3. The apparatus for detecting mechanical impact of claim 1 wherein the circuit board includes a computer processor which is programmable.

4. The apparatus for detecting mechanical impact of claim 1 wherein the first humidity sensor and the first temperature sensor form a first combined humidity/temperature sensor and the second humidity sensor and the second temperature sensor form a second combined humidity/temperature sensor.

* * * * *